(No Model)
DE WITT C. PARKER.
MIRROR SUPPORT OR HOLDER.
No. 419,549. Patented Jan. 14, 1890.
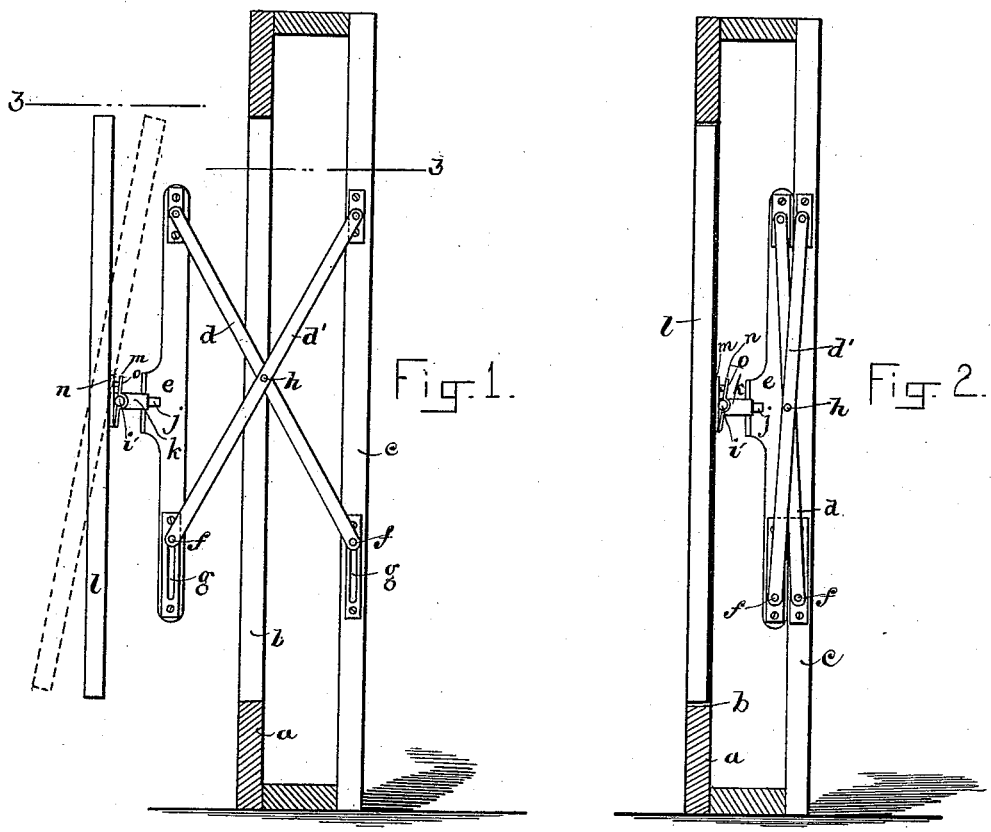
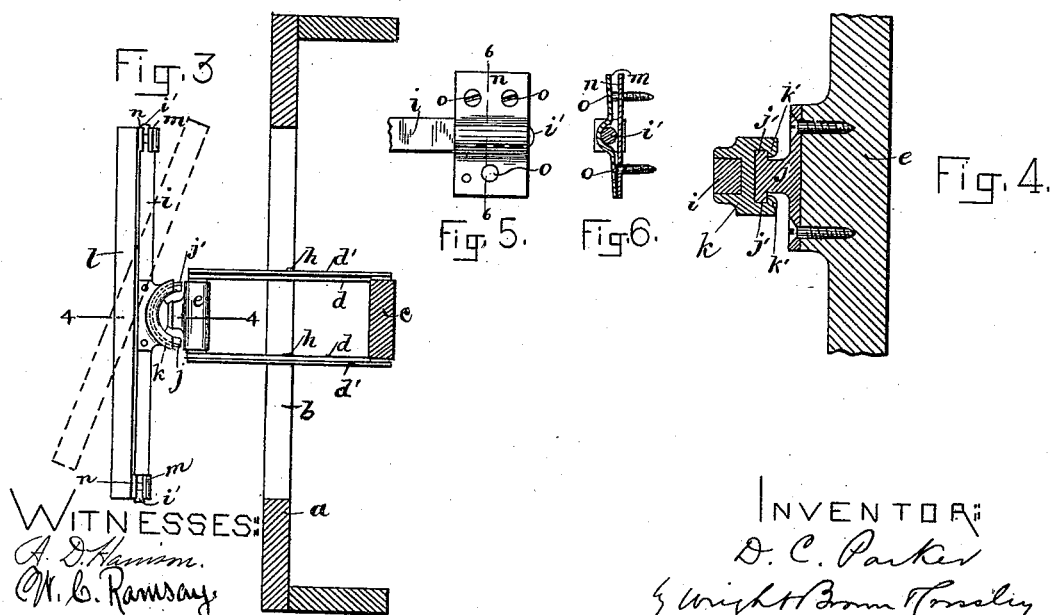
Witnesses:
A. D. Hanson.
W. C. Ramsay.
Inventor:
D. C. Parker
by Wright Brown Moseley
Attys.

UNITED STATES PATENT OFFICE.

DE WITT CLINTON PARKER, OF MILFORD, NEW HAMPSHIRE.

MIRROR SUPPORT OR HOLDER.

SPECIFICATION forming part of Letters Patent No. 419,549, dated January 14, 1890.

Application filed March 21, 1889. Serial No. 304,101. (No model.)

*To all whom it may concern:*

Be it known that I, DE WITT CLINTON PARKER, of Milford, in the county of Hillsborough and State of New Hampshire, have invented certain new and useful Improvements in Mirror Supports or Holders, of which the following is a specification.

This invention has for its object to provide means whereby a toilet-mirror may be connected to a support in such manner that it may be moved bodily from and toward said support and placed at any desired angle.

The invention consists in the improvements which I will now proceed to describe and claim.

In the accompanying drawings, forming a part of this specification, Figure 1 represents a vertical section of a supporting-frame and a side elevation of a mirror and the improved means for connecting it to the frame, the mirror being shown as moved bodily outward from the supporting-frame. Fig. 2 represents a similar view, the mirror being moved back to the supporting-frame. Fig. 3 represents a section on line 3 3 of Fig. 1, looking downwardly. Fig. 4 represents a section on line 4 4 of Fig. 3. Fig. 5 represents a rear view of the friction-hinge shown in Figs. 1 and 2. Fig. 6 represents a section on line 6 6 of Fig. 5.

The same letters of reference indicate the same parts in all the drawings.

In the drawings, $a$ represents a supporting-frame which may be affixed to a bureau or other article of furniture, or may be constructed to stand independently, like the supporting-frame of an ordinary cheval-glass. Said supporting-frame is by preference formed with a front portion containing an aperture $b$ of sufficient size to receive the mirror-frame $l$, and has a vertical bar $c$ behind said front portion, there being a sufficient space between the bar and the front portion of the frame for the reception of the devices hereinafter described, whereby the mirror is flexibly connected with the bar.

$d\ d'\ d\ d'$ represent two pairs of crossed rods which are pivoted at their upper ends to the bar $c$ and to a movable vertical bar $e$, and have studs $f\ f$ at their lower ends, which project into and are capable of sliding in slots $g\ g$, formed in the bars $c\ e$, the rods of each pair being centrally connected by pivots $h$, so that said rods operate like a pair of lazy-tongs and are capable of holding the movable bar at various distances from the fixed bar.

$i$ represents a substantially-horizontal bar which extends across the back of the mirror-frame, and is pivotally connected at its ends thereto by any suitable means, as by the friction-hinges hereinafter described, so that the mirror-frame, by swinging on said bar, can assume a vertical position or any desired inclination from a vertical position, as indicated by the full and dotted lines in Fig. 1. The horizontal bar $i$ is connected with the vertical bar $e$ by a suitable hinge-connection which permits the horizontal bar to stand either parallel with the supporting-frame or at any desired angle thereto, so that either side of the mirror may be moved forward and the other backward, as indicated by dotted lines in Fig. 3.

The hinge-connection between the horizontal bar and vertical bar may be of any suitable construction; but I prefer to make the same of two members, one of which is a segmental rib or flange $j$, formed on or attached in a substantially-horizontal position to the vertical bar $e$, while the other member is a socket $k$, adapted to fit and slide on said segmental rib and formed on or attached to the horizontal bar $i$ and embracing the segmental rib, as shown in Fig. 4. I prefer to make the rib $j$ with lips or flanges $j'\ j'$, giving said rib a T shape in cross-section, the socket being formed with inwardly-projecting lips or flanges $k'\ k'$ to embrace the flanges $j'\ j'$, as shown in Fig 4, this construction insuring a secure connection between the two members, as will be readily seen. The rib $j$ may have but one flange instead of two, if preferred.

The hinges which connect the mirror-frame $l$ to the horizontal bar $i$ are here shown as composed of the trunnions $i'$, formed on the ends of said bar, and clamping-sockets composed of plates $m\ n$, attached to the back of the mirror-frame by screws $o$ and bearing on the opposite sides of the trunnions. The pressure of said plates on the trunnions, which may be regulated by the screws, creates sufficient friction to hold the mirror at any angle from the vertical to which it may be adjusted.

It is obvious that any other suitable construction of the friction-hinge may be employed to connect the bar $i$ with the mirror-frame.

The hinge-connection of the mirror-frame to the horizontal bar, whereby the mirror-frame is enabled to oscillate to and from a vertical position, together with the hinge-connection of the horizontal bar with the vertical bar, whereby the mirror may be oscillated laterally, constitute a gimbal-joint connecting the mirror-frame to the vertical bar.

It will be observed that the vertical bar $e$ and the crossed pivoted rods constitute an extensible connecting-frame connecting the mirror-frame with the fixed bar or support $c$, and enabling the mirror to be moved bodily out and in in addition to the swinging movements permitted by said gimbal-joint connections, the mirror being thus enabled to stand flush with the front portion of the frame $a$, as shown in Fig. 2, or to stand out therefrom as shown in Fig. 1. I do not claim, broadly, however, the combination of a mirror, a fixed support, and an extensible connecting-frame between said mirror and support, said extensible frame being connected to the mirror by a gimbal-joint, such combination, broadly, being, as I believe, the invention of David Heald and Charles H. French, my invention being an improvement in the construction of the extensible connecting-frame and in the means for connecting it with the horizontal bar $i$ on the back of the mirror. It will be observed that the crossed rods, centrally pivoted together and pivotally secured at their upper ends to the fixed bar $c$ and to the movable bar $e$ and having sliding connections with said bars at their lower ends, firmly support the bar $e$ in a vertical position at any point to which it may be moved and prevent it from being inclined or moved independently at either end, both ends of necessity moving alike, so that the bar $e$ always constitutes a firm support wherever it may be adjusted.

It is obvious that the described improvements may be used to support any other article besides a mirror to which it may be found desirable to give the described movements.

I do not limit myself to pivoting the rods $d\ d'$ at their upper ends and providing the sliding connections (the slots $g$ and studs $f$) at their lower ends, for the result will be the same if the lower ends of the rods $d\ d'$ are pivoted to the bar $e$ and support $c$ and their upper ends engaged therewith by said sliding connections.

I claim—

1. The combination, substantially as hereinbefore described, of a mirror or other like article, a support for the same, crossed rods or lazy-tongs $d\ d'$, the latter having a pivotal connection at its inner end with the support and the former a sliding connection at its rear end with the support, and a movable substantially-vertical bar to which the mirror is pivotally connected, said bar having a pivotal connection with the outer ends of the rods $d$ and a sliding connection with the outer ends of the rods $d'$, whereby the bar is enabled to move bodily toward and from the support and is firmly supported in any position to which it may be moved.

2. The combination, substantially as hereinbefore described, of a mirror or its equivalent, a support $c$ for the same, a substantially-horizontal bar $i$, hinged or pivoted at its ends to the mirror, a substantially-vertical bar $e$, connected by a hinge to the bar $i$, and the crossed rods or lazy-tongs having pivotal and sliding connections, as described, with the bar $e$ and support $c$.

3. The combination, as hereinbefore set forth, of a mirror or its equivalent, a support $c$ for the same, a bar $i$, pivotally connected at its ends with the mirror to enable the latter to oscillate vertically, a vertical bar $e$, a hinge connecting said bars $i$ and $e$ and composed of a segmental flanged rib on one bar and the corresponding socket on the other bar, and the crossed pivotally-connected rods $d\ d'$, connecting the bar $e$ and support $c$, said rods having pivotal and sliding connections with said bar and support.

In testimony whereof I have signed my name to this specification, in the presence of two subscribing witnesses, this 5th day of March, A. D. 1889.

DE WITT CLINTON PARKER.

Witnesses:
F. T. SAWYER,
F. W. SAWYER.